(12) United States Patent
Allison et al.

(10) Patent No.: US 11,351,702 B1
(45) Date of Patent: Jun. 7, 2022

(54) THREE DIMENSIONAL FIBER DEPOSITED MULTI-LAYERED/MULTI-BLEND MOLDED FIBER PARTS

(71) Applicant: International Automotive Components Group North America, Inc., Southfield, MI (US)

(72) Inventors: Timothy Joel Allison, Marion, NC (US); James A. Frye, Marion, NC (US); Ernest Franklin Wilson, Albemarle, NC (US); Eric Staudt, Fletcher, NC (US)

(73) Assignee: AURIA SOLUTIONS UK I LTD., London (GB)

( * ) Notice: Subject to any disclaimer, the term of this patent is extended or adjusted under 35 U.S.C. 154(b) by 25 days.

(21) Appl. No.: 15/726,236

(22) Filed: Oct. 5, 2017

Related U.S. Application Data (60) Provisional application No. 62/404,731, filed on Oct. 5, 2016.

(51) Int. Cl.
*B29C 43/34* (2006.01)
*B29C 43/00* (2006.01)
(Continued)

(52) U.S. Cl.
CPC ............ *B29C 43/34* (2013.01); *B29C 43/003* (2013.01); *B29C 43/02* (2013.01); *B29C 43/52* (2013.01);
(Continued)

(58) Field of Classification Search
CPC ....... B29C 70/68; B29C 70/681; B29C 70/54; B29C 70/40; B29C 70/34; B29C 70/342;
(Continued)

(56) References Cited

U.S. PATENT DOCUMENTS

| 3,726,964 A | 4/1973 | Krejci |
| 5,205,018 A | 4/1993 | Leifeld et al. |

(Continued)

FOREIGN PATENT DOCUMENTS

| DE | 10 2005 004 454 B3 | 10/2006 |
| DE | 10 2008 058 952 B4 | 8/2011 |

(Continued)

OTHER PUBLICATIONS

Hasina Mamtaz, Mohammad Hosseini Fouladi, Mushtak Al-Atabi, and Satesh Narayana Namasivayam, "Acoustic Absorption of Natural Fiber Composites," Journal of Engineering, vol. 2016, Article ID 5836107, 11 pages, 2016. https://doi.org/10.1155/2016/5836107. (Year: 2016).*

(Continued)

*Primary Examiner* — Timothy Kennedy
*Assistant Examiner* — Farah Taufiq
(74) *Attorney, Agent, or Firm* — Grossman, Tucker, Perreault & Pfleger PLLC; Steven J. Grossman (57) ABSTRACT

The present disclosure is directed at the deposition of multiple layers and/or multiple blends of fiber which optionally include other additives in a 3D mold. The resulting parts are particularly suitable for automotive acoustic parts that may be used, for example, in under-carpet applications, flooring, headliners, trunk liners, and inner and outer dash liners. The parts may also include acoustic exterior parts. The fibers may also be filled/packed differently within the mold at any specified location.

18 Claims, 9 Drawing Sheets

(51) Int. Cl.
*B29C 43/02* (2006.01)
*B29C 43/52* (2006.01)
*B29C 43/56* (2006.01)
*B29K 105/00* (2006.01)
*B29L 31/30* (2006.01)

(52) U.S. Cl.
CPC ...... *B29C 43/56* (2013.01); *B29C 2043/3433* (2013.01); *B29C 2043/563* (2013.01); *B29K 2105/251* (2013.01); *B29K 2995/0002* (2013.01); *B29K 2995/0064* (2013.01); *B29L 2031/3011* (2013.01); *B29L 2031/3014* (2013.01); *B29L 2031/3017* (2013.01)

(58) Field of Classification Search
CPC ....... B29C 70/28; B29C 70/305; B29C 43/02; B29C 2043/3433; B29K 2995/0064
See application file for complete search history.

(56) References Cited

U.S. PATENT DOCUMENTS

| | | | |
|---|---|---|---|
| 5,529,479 A | 6/1996 | Souders | |
| 6,024,905 A | 2/2000 | Doris | |
| 6,033,607 A | 3/2000 | Kataoka et al. | |
| 6,588,462 B1 | 7/2003 | Ogawa | |
| 7,198,739 B2 | 4/2007 | La Forest et al. | |
| 7,540,307 B1 | 6/2009 | Khambete | |
| 7,698,817 B2* | 4/2010 | Khambete | B60R 13/02 264/250 |
| 7,955,064 B2 | 6/2011 | Heinl | |
| 9,724,852 B1 | 8/2017 | Rees et al. | |
| 2004/0195717 A1* | 10/2004 | Kataoka | D04H 1/54 264/102 |
| 2005/0104197 A1* | 5/2005 | Houle | H01L 23/3733 257/706 |
| 2005/0140059 A1 | 6/2005 | Ernst et al. | |
| 2005/0266203 A1 | 12/2005 | La Forest et al. | |
| 2006/0182935 A1 | 8/2006 | Tompson et al. | |
| 2006/0208378 A1 | 9/2006 | Khambete et al. | |
| 2006/0208379 A1 | 9/2006 | Khambete et al. | |
| 2007/0007695 A1 | 1/2007 | Forster | |
| 2009/0004453 A1* | 1/2009 | Murai | D04H 1/732 428/299.1 |
| 2011/0300334 A1 | 12/2011 | Ueno et al. | |
| 2013/0207292 A1 | 8/2013 | Spengler | |
| 2013/0344281 A1 | 12/2013 | Wright et al. | |
| 2014/0205700 A1 | 7/2014 | Peroz | |
| 2017/0305038 A1 | 10/2017 | Paspek et al. | |
| 2017/0361785 A1 | 12/2017 | Guigner et al. | |
| 2019/0351644 A1 | 11/2019 | Delmas | |

FOREIGN PATENT DOCUMENTS

| | | |
|---|---|---|
| EP | 0 606 184 A1 | 1/1994 |
| EP | 2 032 752 B1 | 10/2011 |
| WO | 2012156234 A1 | 11/2012 |
| WO | 2019162849 A1 | 8/2019 |

OTHER PUBLICATIONS

International Search Report and Written Opinion of International Application No. PCT/US2021/036913, dated Nov. 1, 2021, 12 pages.

* cited by examiner

Relatively Soft/Acoustic Layer
Next To Passenger Cabin For Sound Attenuation

Relatively Stiff Fiber Layer
Localized Stiffness For Deep Wells Or In Areas Needing Extra Support Such As Under Brake Pedals

FIG. 3

Relatively Stiff Fiber Layer
Next To Passenger Cabin For Compression Resistance

Relatively Soft Acoustic Layer
Soft Layer For Damping/Sound Attenuation Next To Sheet Metal

FIG. 4

Acoustic/High Absorption Layer
Fiber Blend For Sound Attenuation

Relatively Stiff Fiber Layer
For Deflection Resistance

Relatively Soft/Acoustic Layer
For Damping/Absorption/Sound Attenuation

Single Layer Fiber Decoupler
Suitable For Use In Fiber & Barrier Acoustic System
Provides Insertion Loss And Substantially No Absorption

THREE DIMENSIONAL FIBER DEPOSITED MULTI-LAYERED/MULTI-BLEND MOLDED FIBER PARTS

CROSS REFERENCE TO RELATED APPLICATIONS

This application claims the benefit of U.S. Provisional Application Ser. No. 62/404,731 filed Oct. 5, 2016, the teachings of which are incorporated by reference.

FIELD

The present disclosure is directed at the deposition of multiple layers and/or multiple blends of fiber which optionally include other additives in a 3D mold. The resulting parts are particularly suitable for automotive acoustic parts that may be used, for example, in under-carpet applications, flooring, headliners, trunk liners, and inner and outer dash liners. The parts may also include acoustic exterior parts. The fibers may also be filled/packed differently within the mold at any specified location.

BACKGROUND

Certain methods have been explored for the purpose of forming a molded fiber configuration, that may then be used in vehicular applications. These include, e.g., U.S. Pat. No. 7,698,817 entitled "Methods Of Forming Vehicle Interior Components Which Include A Decoupler Layer." The method comprises conveying of materials into an enclosure to form a preform having a shape of the enclosure, heating the preform to a temperature such that adjacent materials may bond to one another upon cooling and forming the heated preform into a predetermined three-dimensional decoupler configuration via a mold. The materials can include thermoplastic material, thermoset material, fibrous material, foam, woven material, nonwoven materials, and fibers. However, this patent is not understood to disclose the capability to include different fiber blends deposited in multiple layers in a given vehicle molded part configuration.

Reference is also made to U.S. Publication 2004/0195717 entitled "Method And Apparatus For Forming Fiber Aggregate." The method is described as molding fiber aggregate comprising placing divided members of a mold obtained by dividing the mold having gas permeability into the plurality of members in a developed state, filling cavities of divided members of the mold in the developed state with fiber aggregate where binders fibers having a lower melting point than that of crimped synthetic staple fibers are dispersed and mixed in matric fibers composed of the crimped synthetic staple fibers, respectively. The divided members of the mold are united followed by heating the united fiber aggregate and fusing the binder fibers to the matrix fibers at their crossing points and then cooling and solidifying and providing a molded product. This patent is not understood to disclose depositing various fiber layers or placing a particular fiber blend into the mold and ultimately the final part to provide different acoustic and/or mechanical properties (e.g., compressibility).

Attention is next directed to U.S. Publication No. 2007/0007695 entitled "Method And Device For Producing Three-Dimensional Molded Parts And Corresponding Molded Parts." This application discloses the production of three-dimensional parts made of fiber material. The fibers are reportedly blown into the interior of the mold consisting of a bottom mold and a top mold by means of an air current. The air, which is the carrier of the fibers, escapes through holes in the bottom mold and/or the top mold. The fibers are deposited on the inner sides of the bottom mold and top mold until the mold is filled, whereby a preform made of fiber material is formed. The fibers are bonded by means of a bonding agent.

Accordingly, a need remains for an apparatus and process to provide the ability to place, e.g., selected fiber compositions and/or selected differing fiber blends and/or fiber layering with different or the same blends and/or different densities within similar thicknesses, or even relatively stiffer or softer fiber material, into selected areas or layers of the same mold for ensuing producing of a vehicle part. Such capability would therefore provide for the complete elimination of materials such as foamed polystyrene or expanded polypropylene pad installation typically attached to the underside of automotive carpet applications which invariable require an additional step and cost associated with such procedures.

SUMMARY

The present invention is directed at a method for forming a fibrous part comprising: (a) providing a first tool portion of a mold for shaping a fibrous part having a molding surface and including perforations along all or a portion of the molding surface; (b) providing one or more robotic fiber injectors and introducing fiber and binder to all or selected areas of the tool and providing vacuum to all or selected areas of the tool; (c) determining that the tool has achieved a selected fiber loading level; (d) providing a second tool portion and closing the first and second tool portions and heating with heated air and forming a fiber part; and (e) removing 0 to 35.0% by weight of the formed part. Optionally, one may generally fill such mold, before or after the use of the robotic fiber injector, with fiber to form a layer of fiber having desired characteristics for the final molded part. In addition, the one or more robotic fiber injectors can inject different fiber blends.

The present invention also relates to a method for forming a fibrous part comprising: (a) providing a first tool portion of a mold for shaping a fibrous part having a molding surface and including perforations along all or a portion of said molding surface; (b) providing one or more robotic fiber injectors and injecting one or more different fiber blends to all or selected areas of the tool and providing vacuum to all or selected areas of the tool; (c) determining that the tool has achieved a selected fiber loading level; and (d) providing a second tool portion and closing the first and second tool portions and heating with heated air and forming a fiber part.

BRIEF DESCRIPTION OF THE DRAWINGS

The present disclosure may be more fully understood from the detailed description provided herein, and form the accompanying drawings. The drawings, which are not to scale, are provided by way of illustration only and are not intended to limit the scope of the invention.

DETAILED DESCRIPTION OF PREFERRED EMBODIMENTS

Figure 1:
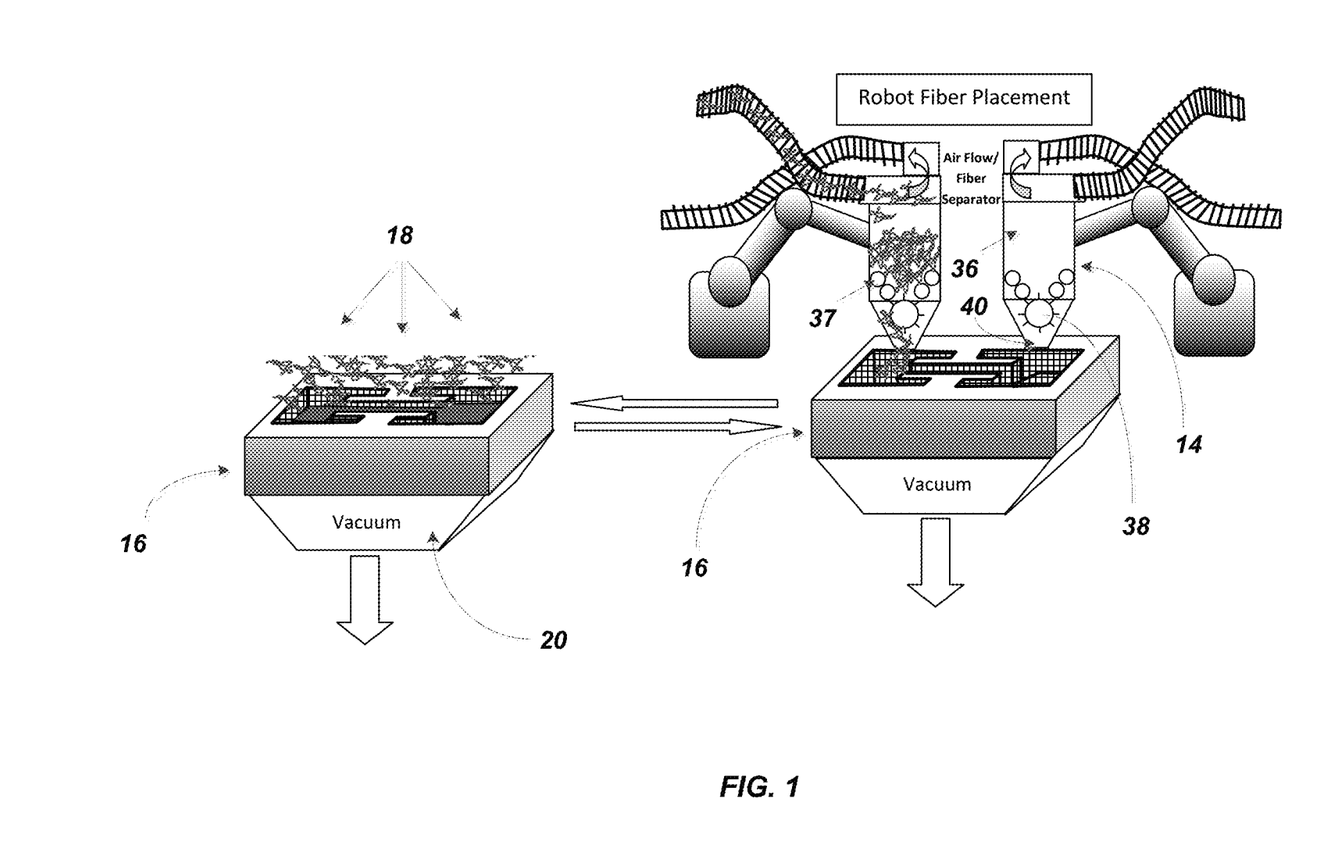
FIG. 1 is a schematic view of an apparatus for manufacturing the three-dimensional molded fiber parts herein.

Referring to FIG. 1, a schematic illustration is provided of one example of preferred dual apparatus for manufacture of the three-dimensional molded fiber part herein in a two-step fiber deposition process (e.g., deposition of fiber or other material such as binder using a general fiber delivery procedure into a bottom mold and deposition of fiber using a multi-axial robotic arm injector, which deposition order may be reversed and which deposition process may be used independently on one another). This injector 14 can selectively feed fiber or other material to the bottom mold portion 16, which is preferably perforated along either a portion or the entirety of its molding surface to allow for application of vacuum to draw the fibers towards its surface for layering and/or ensuing molding procedures. This bottom mold 16 is also preferably inverted so that when the part is taken out of the mold the bottom side is the top of the part. This allows gravity and vacuum to work together to pull the fiber to the bottom mold which creates a relatively better texture for the top surface of the carpet to be molded to.

The robotic fiber injector 14, two of which are illustrated, may therefore first selectively introduce fiber and binder to the entire area of the perforated mold 16 or only to specified areas. The mold may then travel to a position under a general fiber delivery apparatus 18 which can introduce additional fiber to the mold bottom portion 16, which may preferably be achieved by gravity feed and be augmented by vacuum. It may therefore be understood that fiber delivery apparatus 18 is preferably configured to allow for fiber to be introduced as a general pattern, such that fiber is now simultaneously introduced to the entirety of the available mold surface of mold bottom portion 16 or as a layer on top of any fiber that was previously deposited. The general fiber delivery apparatus, which may utilize a number of available fiber delivery techniques, may be preferred when a relatively more evenly distributed fiber layer is desired.

As alluded to above and as illustrated in FIG. 1 the process may be fully reversed. That is, one may initially and selectively introduce fiber into perforated mold bottom portion 16 at 18 followed by employment of one or more robotic arm injectors 14 to introduce fibers to predetermined mold locations, which mold locations may then already contain one or more fiber layers. In either case, once the mold is determined to have the requisite amount of fiber loading, the top mold is brought in place above the bottom mold and then heated with hot air and vacuum to consolidate the fiber into a completed part.

It has also been observed that preferably, not compressing the fiber in the heating stage allows for relatively faster heating and molding cycles. For instance, a typical heat cycle at 425° F. for 2 minutes, may be reduced to 1 minute if the fiber is not compressed before it is heated. Once the binder fiber is fully heated, the mold is closed completely and the final shape is taken by the fibers along with any other components, further described herein, that may be included. The fiber and mold are then cooled so the molded fibers now maintain their specified shape. It is also contemplated to pull the fiber into the top mold before heating if the top mold is the surface that needs to be the "A" side surface (surface the carpet is attached to). In FIG. 1, mold location 16 is illustrated along with vacuum capability at 20.

It should now be appreciated that vacuum may be selectively provided from the top and/or the bottom of the mold. Also included in this process, as described further herein, is the ability to locally open or close gates on the bottom or top mold to allow more or less (0 to 100%) vacuum to certain areas of the mold to assist in fiber coverage of the mold. For example, a 9.0" duct pipe having the ability to carry 5000 cfm may be connected to the bottom of a mold, which will reduce the vacuum created when allowed to pull from the entire surface of the mold. But if there are louvers or gates that close a portion of the mold (e.g. greater than 50% of the available mold surface area, or in the range of 50%-90% of the available mold surface area), and such closing of the louvers or gates only allow air to be pulled through the remaining open mold portions (i.e. the relatively smaller areas where the fiber is being introduced) the vacuum in these remaining open areas increases and allows the fiber to fill those areas relatively faster and relatively more evenly with relatively more fiber. In addition, vacuum may be applied to the entire surface of the mold, such that all of the fiber in the mold is subjected to a vacuum pull to densify all of the fibers that are introduced in the mold.

It can be appreciated that with the ability herein to provide a relatively smaller area for which the vacuum is applied, for example 2 separate chambers with a dimension of 3.0" by 5.0" in area, versus the entire surface of the mold at 78.0" by 120.0", a relatively greater draw will now be imposed on flowing fibers, which therefore will fill the remaining smaller cavities and relatively harder to fill features more easily. For example, sharp edges versus rounded edges, or relatively thin deep contours ranging from 13.0 mm wide to 75.0 mm wide and 13.0 mm deep to 300.0 mm deep. This also allows for fiber to "stick" to more difficult to stick to vertical surfaces.

It is also feasible now, that the mold itself can be made so that the part is net shape which helps increase the vacuum at key locations and lowers the amount of fiber lost in the subsequent cutting processes when assembling the entire carpet construction. By reference to net shape, it is understood to be the final molded part, without any amount or relatively large amounts of excess material, which typically may form on the edges thereof. It has been observed that other "blown fiber" technology for undercarpet applications must be trimmed after the fact, along with other internal regions, which increases further waste. In the context of the present invention, for a given part, the percent by weight of trim that is now produced is less than or equal to 35.0%, or preferably less than or equal to 10.0%, or more preferably less than or equal to 5.0%. Subsequent to such trimming operation, the part herein may be installed directly into the vehicle. Accordingly, it may be understood that for a given part, the amount of trim removed may be 0 to 35.0% (wt), or 0 to 10.0% (wt.), or 0 to 5.0% (wt.).

From the above, it can therefore be appreciated that the present invention provides the ability to selectively densify one or more portions of the final net shaped molded part relative to the remainder of the part. For example, one may now selectively produce portions or selected areas of the final net shaped molded part that have a density that is relatively higher than the density of other selected areas of the final net shaped part. In construction of such part herein, one may therefore preferably select from a density in the range of 20 $Kg/m^3$ up to and including 200 $Kg/m^3$ and selectively position any selected density in this range at a desired location in the part.

For example, one may preferably configure the part such that the density of the relatively more dense section is at or above 80 $Kg/m^3$ or in the range of 80 $Kg/m^3$ to 200 $Kg/m^3$. Accordingly, the density of the relatively lower density section, in this particular example, would be less than 80 $Kg/m^3$ or in the range of 20 $Kg/m^3$ up to but not including 80 $Kg/m^3$.

In a still further example, one may configure the part such that the relatively more dense section is above 120 $Kg/m^3$ while the other relatively less dense sections have a density that is less than 120 $Kg/m^3$. Therefore, those skilled in the art will now recognize that with respect to the preferred available density range of 20 $Kg/m^3$ up to and including 200 $Kg/m^3$, one may select and form a part where as noted, the density of any selected location is relatively higher than other locations in the remainder of the part.

By way of yet a further example, the net shaped molded part may have one or a plurality of 3.0" by 5.0" sections that are configured to have a preferred density in the molded net shaped part in the range of 100-140 $Kg/m^3$ and the density of the remaining sections can be higher or lower than this value. The use of one or more robotic injectors 14 may therefore provide other sections in the final net shaped part such as a 12.0" by 12.0" section, which may be a target for the footwell location in the vehicle. Accordingly, the density of these sections, of which there may again be one or several, can now be preferably adjusted to be 10% to 1000% higher than the density of the other sections of the fiber part.

For example, one may have one or a plurality of sections in the part that have a density of 200 $Kg/m^3$ whereas other sections of the part have a density of 20 $Kg/m^3$. As may be appreciated the plurality of sections in this particular example having a higher relative density would have a density that is 10× the density of other sections of the part. One may therefore understand that such higher density sections can be understood as selected island type locations of higher density that that are distributed within the lower density background area of the part.

Stated yet another way, the fiber part herein that is ultimately placed in the vehicle may have one or a plurality of sections that have a different density (higher or lower) than other sections of the part. That is, the vehicular fiber part contains selected areas or regions that have a density that is different than other selected areas or regions of the part. For example, for a representative fiber part that has an area of 78.0" by 120.0", such a part may have one or a plurality of 18"×18" areas for placement in the footwell of the vehicle that now indicate a different density than other areas. This can then provide for a fiber part that has selected areas of higher density fill that will provide better performance for a given vehicle application, such as in the driver's side and passenger's side floors where the need for higher compression is required. Alternatively, the fiber part may have selected areas of lower density fill to reduce weight and cost for part preparation, and where lower density fill can be tolerated to still meet vehicle manufacturing requirements.

Furthermore, it can be appreciated that the one or plurality of injectors 14 may now be configured to apply multiple layers having different densities. For example, one may form a first entire layer having a first selected density (d1), and a second entire layer having a second density (d2), wherein d1≠d2. Accordingly, the one or plurality of injectors can not only form selected areas of selected density, as described herein, they may also form: (1) one or more selected layers of different density; or (2) multiple layers having the same density separated by one or more layers with different density values.

Furthermore, the one or more injectors 14 are such that they may also selectively introduce different fiber blends that ultimately provide different physical properties in the final net-shaped part. For example, the one or more injectors 14 may first introduce a first fiber blend that provides for relatively higher stiffness in the net shaped part than a second fiber blend. As described further herein, such may be achieved by varying the binder content or fiber types/materials. Preferably, one may therefore utilize, e.g., two fiber injectors 14, one that is configured to deliver the first fiber blend and a second that is configured to deliver the second fiber blend, where as noted, the first fiber blend provide higher stiffness characteristics. Reference to fiber blend herein is reference to the overall composition of the synthetic polymeric and natural polymeric fibers present in the blend. Accordingly, a fiber blend is understood herein as different than another fiber blend when: (1) the relative amount of the synthetic polymer fibers and/or natural polymeric fibers that make up each respective blend are present at different levels; or (2) each blend includes, from a compositional perspective, one or more different synthetic polymer and/or natural polymeric fibers. For example, two blends may be understood as different when the first blend contains 65% by weight of fiber A and 35% by weight of fiber B versus a second fiber blend that contains 50% by weight of fiber A and 50% by weight of polymer fiber B. In addition, different fiber blends may be understood as present when the first blend contains 65% by weight of fiber A and 35% by weight of fiber B and the second blend contains 65% by weight of fiber C and 35% by weight of fiber B.

In addition to the above, the mold herein may include spaces or areas that extend through the top mold that will allow for relatively small open shapes of desired geometry to be left in the part once it is heated, molded and removed from the mold. Some areas may be as small as slits for clips to be placed after the carpet is molded on top of it. In other words, sections may now be placed in the mold where no fiber or any other material will be placed when the part is removed. Such open sections may be 5.0 mm to 500.0 mm in width, preferably 5.0 mm to 50.0 mm in width or diameter for smaller cutouts.

With attention now directed to the robot arm fiber injector 14, one may preferably include within the chute 36 of the robot arm an airflow fiber separator and feed rollers 37. Such an airflow separator and feed rollers can feed fiber towards a pin roller 38 that will direct the fiber at a relatively uniform feed rate into the mold bottom portion 16 without turbulent airflow (i.e. airflow having local velocities and pressures that vary). If using a standard fiber blowing chute/duct, the turbulent air which directs the fiber into the mold is difficult to control so that the fiber going into the mold is not disturbed. This turbulent airflow normally blows some of fiber away from the deposition location and creates voids or eddy currents that can cause the top portion of the deposited fiber to have a lower density than the lower portion of the deposited fiber. This causes unwanted variation within the part. Finally, it may be appreciated that the opening 40 of the chute 36 can be sized to facilitate placement of fibers at selected locations in the mold bottom portion 16. Preferably, the opening 40 has dimensions smaller than the dimensions it is filling. That is, the opening may have an opening that 2.5% to 10.0% smaller in area than the area that it is filling, due to the fact that the blown in fibers will typically expand during the blowing in process. In general, the opening 40 herein has a dimension falling in the range of 5.0 square inches to 10,000 square inches, more preferable 15.0 square inches to 350.0 square inches.

For example, in those situations where the objective is to avoid the placement of expanded polypropylene (EPP) foam pads on a given molded part, the opening 40 may now be conveniently configured to provide blown-in fiber having final dimensions of the otherwise required EPP pad. Typically, EPP pads range in dimensions from 3.0"×5.0" and up to 18.0"×18.0", and fiber placement herein may now be so directed to provide such dimensions a particular selected area within a given part profile and cross-sectional area. Accordingly, the part herein may include one or a plurality of sections, having dimensions ranging from 3.0"×5.0" to 18.0" by 18.0" that have a density that is greater than the surrounding density of the net-shaped fiber part, and define a part that avoids the use of expanded polymer foam such as expanded polypropylene foam.

Continuing with the general description of FIG. 1, once it is determined that fiber bonding and pressing together of the mold top and bottom portions is in order, a heated air flow is introduced to set/bind the fiber into the desired shape as the fiber is compressed and the part is formed. The heat flow is one that may be adjusted to flow about the mold outer surface which heat flow may also be cycled, depending upon the binding requirements of the fiber and any other material (e.g. binder) which has been charged into the mold interior volume.

From the above, the present apparatus and method is therefore one that may conveniently provide a number of beneficial features with respect to the ability of forming a final molded part. First, one or a plurality of fiber layers may be provided where, e.g., the thickness of the individual layers may preferably range from 5.0 mm to 250 mm, more preferably 5.0 mm to 125 mm, and even at 5.0 mm to 50 mm. The number of layers may range from 1-8. Accordingly, the product herein may contain 1, 2, 3, 4, 5, 6, 7 or 8 fiber layers. When more than one fiber layer is present, they may be of different densities and/or fiber composition. For example, the density of each respective layer may fall in the range of 10 kg/m$^3$ to 200 kg/m$^3$, 10 kg/m$^3$ to 100 kg/m$^3$, or 10 kg/m$^3$ to 50 kg/m$^3$. One particularly preferred range is 80 kg/m$^3$ to 140 kg/m$^3$.

Preferably, 2 to 4 layers are contemplated for a floor component in a vehicular application. Fiber lengths in any of the layers may preferably fall in the range of 1.0 mm to 75.0 mm, more preferably in the range of 5.0 mm to 35.0 mm. However, even smaller fibers, e.g. 0.1 mm up to less than 1.0 mm) or powders being laid down is conceivable, if needed to meet a given engineering specification. Accordingly, fiber length herein may range from 0.1 mm to 75.0 mm.

Attention is next directed to FIGS. 2-5 which identify some contemplated examples of the molded parts that may be prepared herein and as may be utilized to form a vehicular floor panel that has an acoustic layer that provides sound attenuation. That is, one may form herein what may be understood as an acoustic absorber layer, where the layer is sufficiently open to absorb sound. Such acoustic absorber layer may have a thickness of greater than or equal to 5.0 mm and a mass of greater than or equal to 300 g/m$^2$. In addition, one may herein form an acoustic decoupler layer, which may be understood as a layer that breaks the direct path of sound. For example, a layer that has a thickness in the range of 2.0 mm to 75.0 mm, preferably positioned between a mass layer (e.g., a non-air permeable barrier layer) and the metal sheet of a given vehicle.

Figure 2:
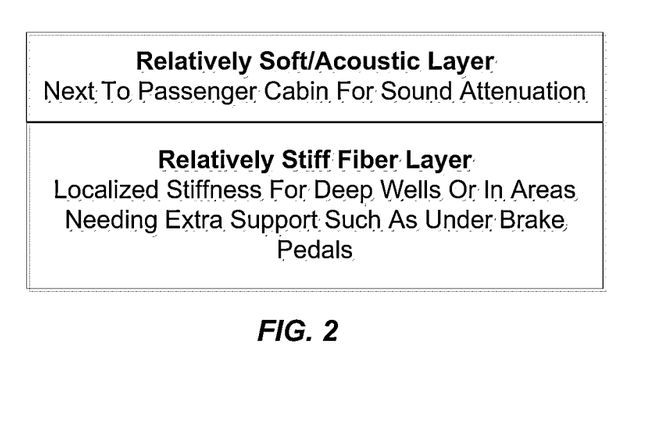
FIG. 2 is an illustration of one layering configuration having a relatively soft/acoustic layer over a relatively stiff fiber layer.

FIG. 2 illustrates that one may now form a layered part where there is a top layer that is a relatively soft/acoustic layer positioned next to the passenger cabin for sound attenuation. More specifically, reference to the layer being relatively soft is reference to the feature that the layer has a stiffness (K) from 0.1 to 5500 N/m. Preferably, the layer has an absorption coefficient of 0.4 to 1.0 at frequencies greater than or equal to 500 Hz. Reference to the feature that the layer is a relatively stiff fiber layer is reference to the feature that the layer's stiffness (K) is anywhere from 5501 N/m to 1,000,000 N/m. Stiffness is defined as K=F/d where F is the force in newtons applied over an area of 0.0014062 m$^2$ in the middle of a square sample specimen of 0.09 m$^2$ The displacement of the sample in the direction of the force applied is measured in meters. This yields newtons (N) per meter (m).

By way of example, the fibers that can be utilized for the relatively soft/acoustic layer include cotton, PET, PP, Acrylic, PA, recycled shoddy, as well as other natural and synthetic fibers. In addition, foam pieces may be dispersed in such fibers, the foam pieces having a size of 0.125" to 1.50" and wherein the foam pieces are present at a level of 5.0 to 50.0 wt. %. The fibers that can be utilized for the relatively stiff fiber layer may include the same fibers mentioned for the soft acoustic layer along with a relatively higher binder content and/or a selection of those fibers that themselves have relatively higher tensile strengths and relatively higher stiffness (e.g. PET over PP) that will then contribute to increasing the flexural modulus of such layer. Accordingly, the binder content of the relatively soft acoustic layer may be in the range of 10.0 wt. % by weight to 30.0 wt. % and the binder content of the relatively stiff fiber layer may be in the range of 10.0 wt % to 50.0 wt. %, depending on the type of fibers used. If the same fibers are used for both a soft and stiff part, the weight percent of binder would be around 10 to 25% while a stiffer fiber layer would be around 30% to 50% binder by weight.

Figure 3:
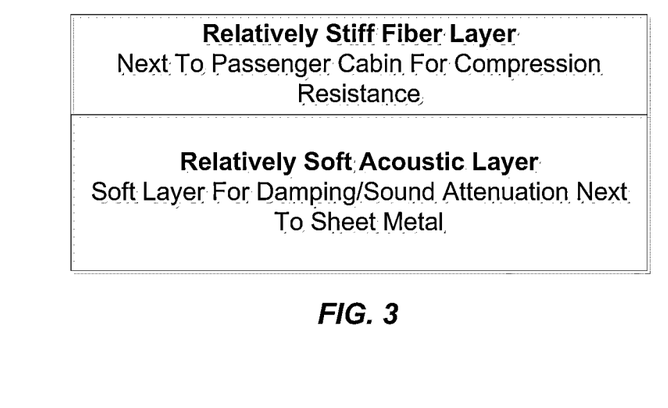
FIG. 3 is an illustration of a relatively stiff fiber layer over a relatively soft fiber layer.

FIG. 3 illustrates the formation of a floor panel containing a relatively stiff fiber layer described above next to the passenger cabin, which may then also provide for compression resistance. As alluded to above, this construction can now be selectively located within the molded fiber parts produced herein. Compression resistance is reference to the feature of relatively high stiffness/low deflection or the ability for the fiber to resist movement with applied load. An example of a typical automotive OEM specification for compression resistance may be defined as: 70 mm thick undercarpet with a 300N force requires less than a 6.0 mm deflection to pass the specification. Accordingly, a relatively stiff fiber layer having such compression resistance may now include as illustrated in FIG. 3 relatively soft acoustic layer for damping and sound attenuation that will be placed next to the vehicle sheet metal.

Figure 4:
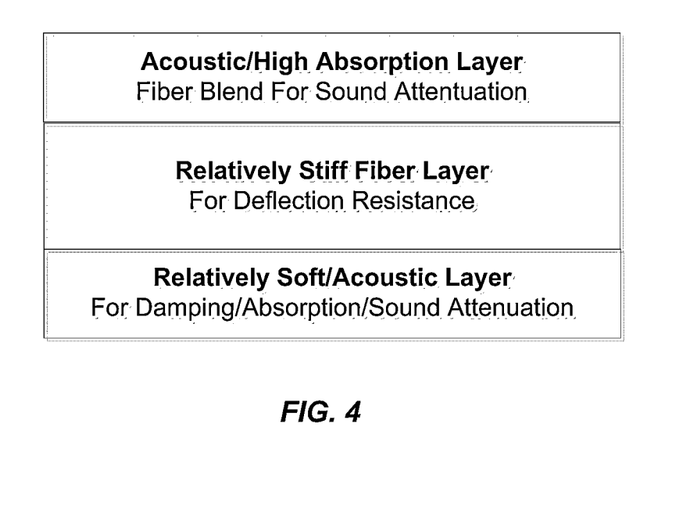
FIG. 4 is an illustration of an acoustic/high absorption layer over a relatively stiff fiber layer over a relatively soft fiber layer.

FIG. 4 illustrates the formation of a three layer vehicle floor panel, the top layer next to the passenger cabin identified as an acoustic/high absorption layer comprising a fiber blend for sound attenuation. Reference to an acoustic/high absorption layer is reference to the feature that the layer provides relatively large absorption coefficients, e.g. in the range of 0.5 to 1.0. Under this acoustic/high absorption layer there is a relatively stiff fiber layer for deflection resistance (stiffness K in the range of 5501 N/m to 1,000,000 N/m). This is then followed by the relatively soft/acoustic layer as described above providing sound attenuation. In addition, it is also preferred that the relatively soft/acoustic layer provides damping and absorption to further separate the vibrations from the car's sheet metal so that the sound coming from this sheet metal is not transferred into the three-layer panel and transferred into the cabin.

In connection with any of the various vehicle floor panels that are contemplated herein, it is noted that such panels, and the fiber layers therein, may include some amount of relatively low cost waste fibers as well as non-fibrous waste, such as granulated foam (0.125" to 1.50"). More specifically, the relatively low cost waste fibers include recycled textiles or shoddy materials. Non-fibrous waste may include polymeric foam, shredded plastics, powders, etc. The amount of such relatively low cost waste fibers that is used in any layer may fall in the range of 0 up to 100% by weight. The amount of waste granulated foam that may be mixed in with the fiber may fall in the range of up to 50% by weight foam.

In addition, given the ability to selectively locate fibers at any desired location in the mold, the present disclosure provides for the ability to place a desired amount of relatively stiffer or softer fiber into those deeper well areas of the bottom mold portion 16. A deeper well area of the mold may be understood as a section of the mold that is thicker than other sections. Accordingly, when a deeper well area of the bottom of the mold is provided with the relatively stiffer fibers, the present disclosure avoids the need to then place at such location an expanded polypropylene or expanded polystyrene type pad. This then eliminates the separate use of such expanded polypropylene or expanded polystyrene pad and can provide for a vehicle flooring material that provides extra wear resistance or structural support at those locations of the floor panel where such additional mechanical performance may be required.

Figure 5:
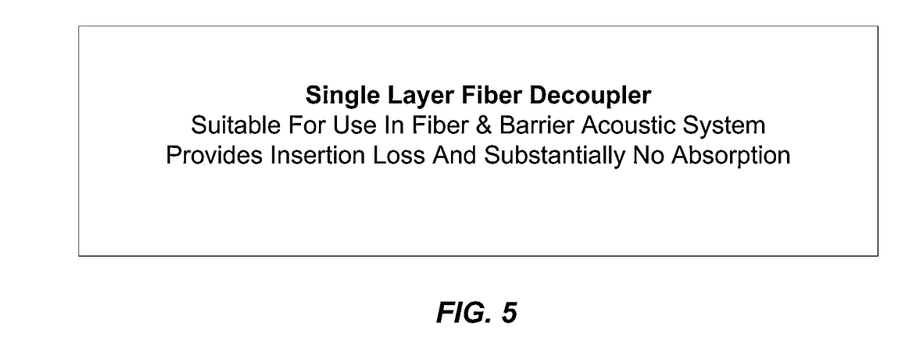
FIG. 5 is an illustration of single layer fiber decoupler.

FIG. 5 illustrates a single layer fiber decoupler, which would be suitable for use in a fiber and barrier acoustic systems to provide insertion loss and substantially no absorption. Reference to insertion loss is reference to the feature that sound is stopped from traveling through that particular system. Examples of constructions suitable for use in the single layer construction of FIG. 5 include virtually any fiber blend with 15 to 50% binder fibers where multiple layers are not required to meet engineering specifications for a vehicle.

As alluded to above, robotic fiber injector 14, in addition to delivering fiber, is contemplated to also include the ability to provide other non-waste materials, such as adhesives, flame retardant components, binders, or any other non-waste materials that may be useful in the final vehicle floor panel. As alluded to above, these other materials may be present at a level in the range of 1.0 wt % to 25.0 wt. %. In addition, it is contemplated that the robotic injector 14 may also provide nanofibers or meltblown fibers. Reference to nanofibers is reference to fibers that are below 1 micron in diameter and more preferably having diameters falling in the range of 50 nanometers to 900 nanometers. Along those same lines, it is also contemplated that fibers may be utilized herein ranging in denier from 25 to 500 which can now be conveniently deposited in the mold.

As may be appreciated from all of the above, the present disclosure now provides for the ability to place various fibers and fiber blends directly into the bottom portion of a mold utilizing a controllable airflow direction of vacuum and/or heated air. Once the mold is filled with the required configuration of fiber or other material (e.g., fiber type and density/weight at a selected location in the mold) the mold can be heated and pressed together with a mold top portion to form a vehicle floor panel with both structural and acoustical properties present at various selected locations or through-out a given part layer. The present disclosure therefore identifies both an apparatus and method of providing what is considered to be a relatively more efficient method of manufacturing along with a customized flooring type product for the automotive industry.

It can now also be appreciated that the parts herein may be made using only multiple articulators (e.g. fiber injectors attached to a robotic arm) and/or by fixed ducting technology depositing the differing fiber blends or in combination with one or more fiber dosing systems. The deposition of fiber is as noted preferably achieved with robotic arms and/or articulated multi axis mechanisms, or fixed ducts/injectors.

Figure 6A:
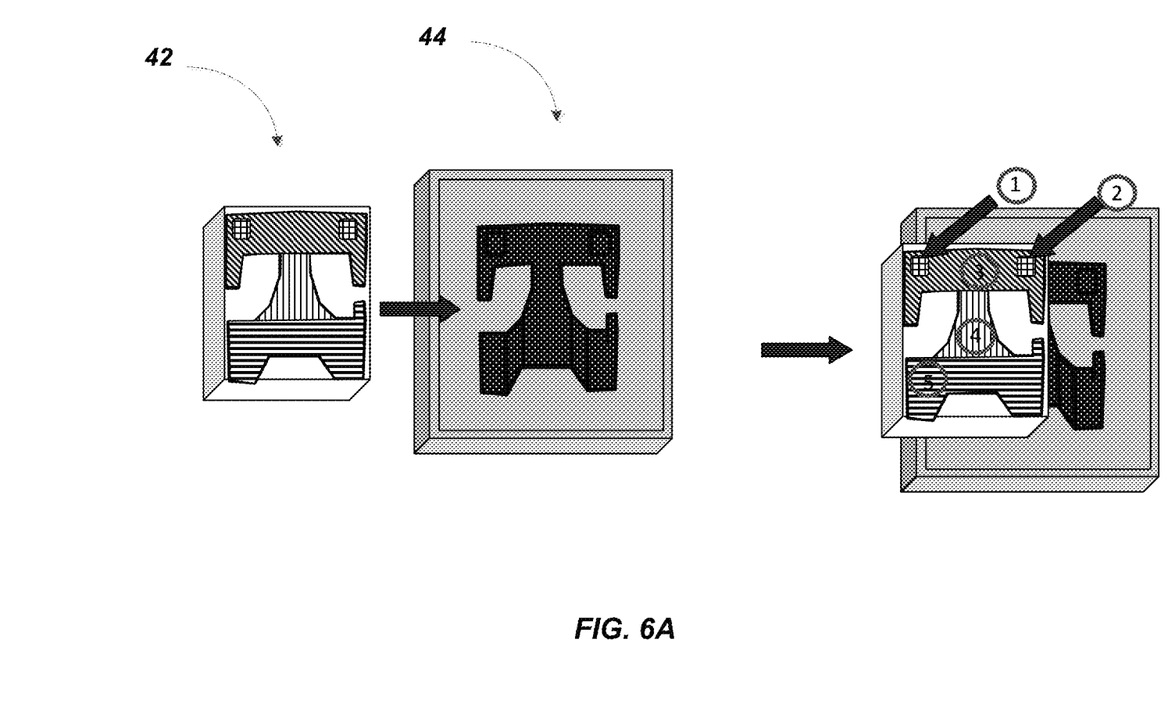
FIG. 6A is an illustration of a zoned chute for fiber deposition.
Figure 6B:
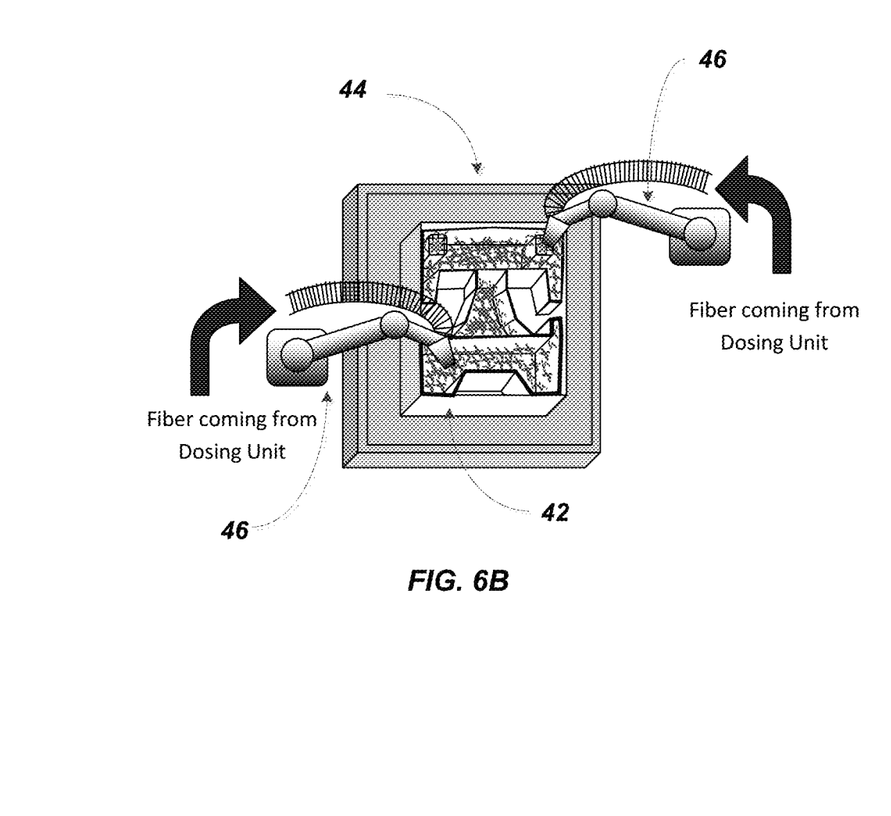
FIG. 6B is an illustration of zoned chute for fiber deposition used in conjunction with a robotic arm for fiber dosing.
Figure 6C:
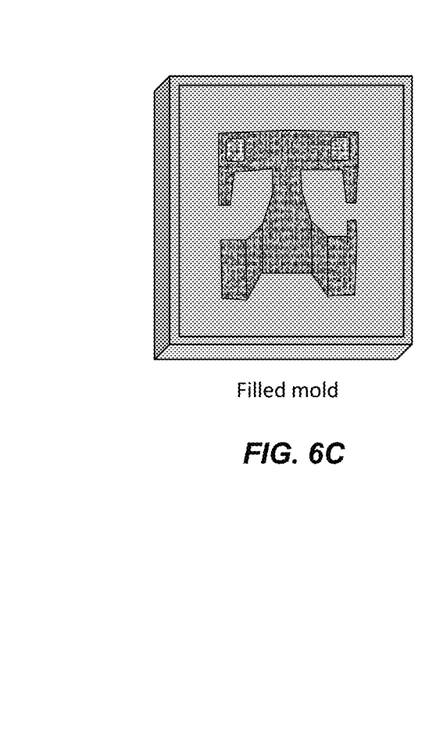
FIG. 6C is an illustration of the mold after filing.

Attention is next directed to FIG. 6A which illustrates a possible sequence in which a zoned chute 42 may now be positioned over a perforated net shape mold 44. The zoned chute may have, as identified, a plurality of zoned regions 1, 2, 3, 4 and 5, which have different patterns, which when placed over the perforated mold 44, will now draw fibers in according to such general pattern requirements. For example, as illustrated in the sequence shown in FIG. 6B, when utilizing robotic fiber injectors 46, of which one or a plurality may be used in the present disclosure, one can selectively fill different fiber compositions (e.g. one form of polymeric fibers having a different polymeric composition than another form of polymeric fibers) and/or different fiber blends to select locations in the mold as the fibers pass through zoned chute 42. The mold, filled after use of the zoned chute, is illustrated in FIG. 6C.

Figure 7:
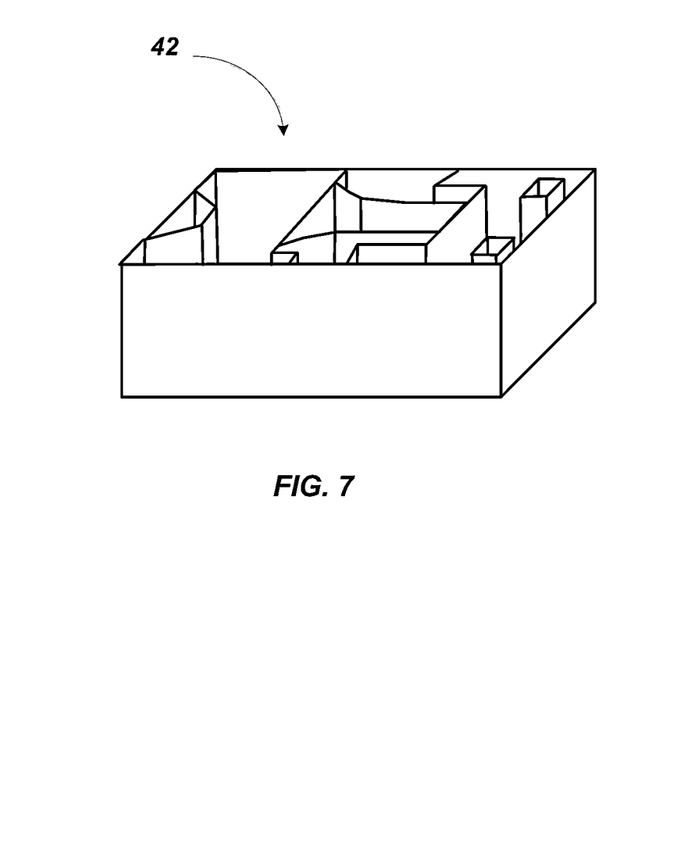
FIG. 7 is a perspective view of a zoned chute.
Figure 8:
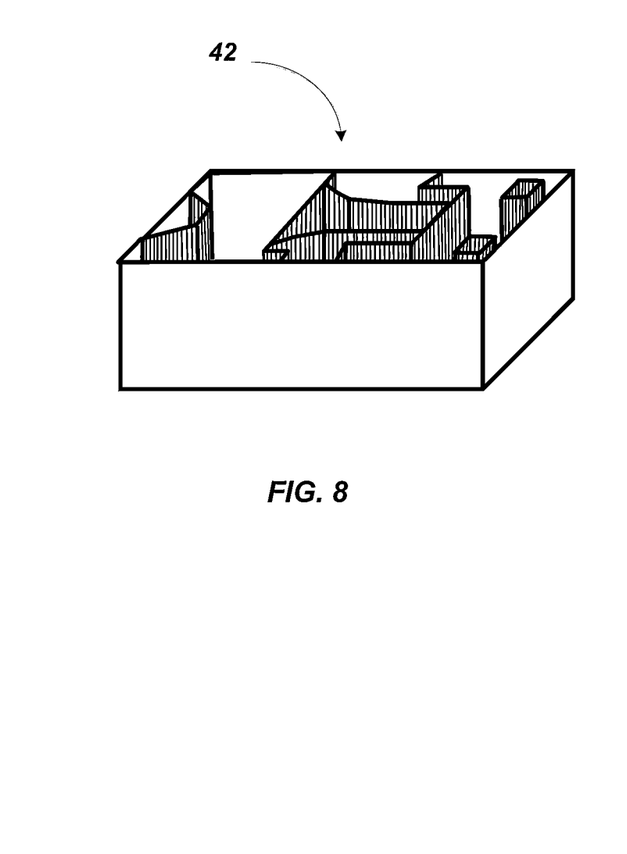
FIG. 8 is a perspective view of a zoned chute having a pinned design.

FIG. 7 provides a perspective view of the zoned chute 42. FIG. 8 is another zones chute 42 using a pinned design. Reference to pinned design is reference to the feature that the pin design includes a plurality of longitudinally extending sections, preferably made of metal, and preferably tubular in shape, that provide openings between the pins, that allow the fibers to cross over between the different zones so the fibers interact/contact at their mating surfaces and when the pinned chute is lifted, the fibers maintain such interaction and once heated there is no mating line or weak spot between the various zones. The openings between the pins may have a value in the range of 5.0 mm to 75.0 mm, more preferably 25.0 mm to 50.0 mm.

Figure 9:
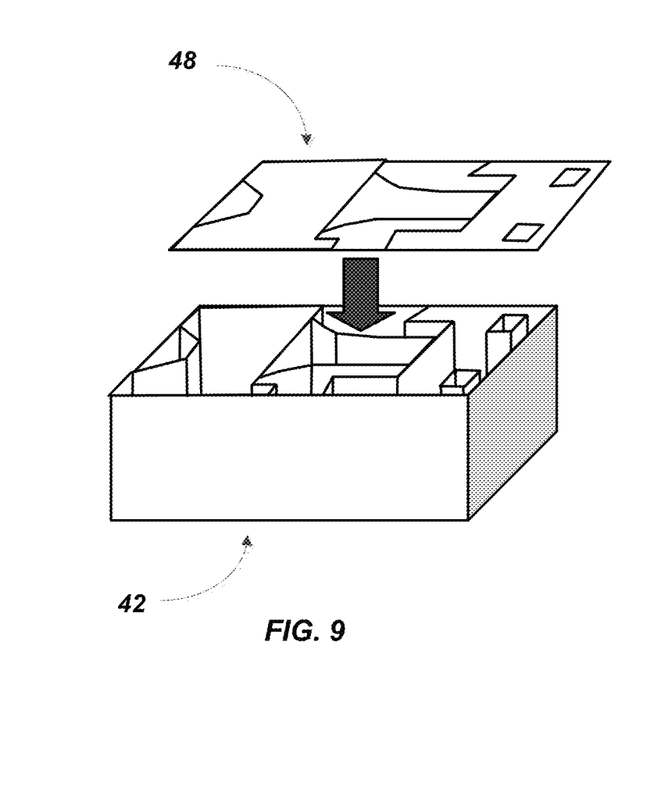
FIG. 9 is an illustration of the use gates positioned over a zoned fiber chute.
Figure 10:
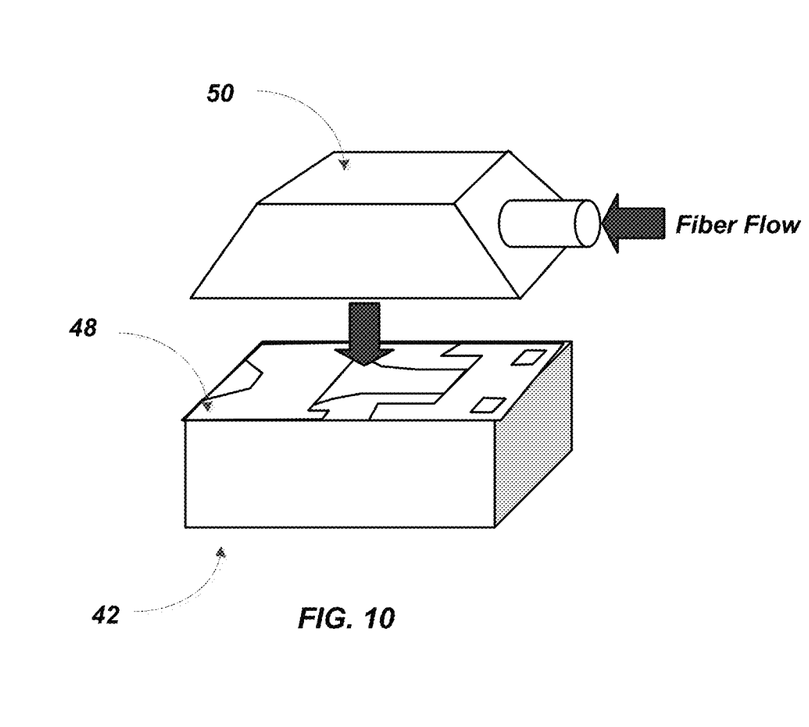
FIG. 10 is an illustration of the use of a hood positioned over the gates positioned over the zoned fiber chute.

FIG. 9 is an illustration of the use of gates 48 that may be positioned over zoned fiber chute 42. It can be appreciated that the gates are such that they will now only permit vacuum to be applied to selected areas. FIG. 10 is an illustration of the use of a hood 50 that can be positioned over the gates 48 which gates are then positioned over the zoned fiber chute 42.

Figure 11:
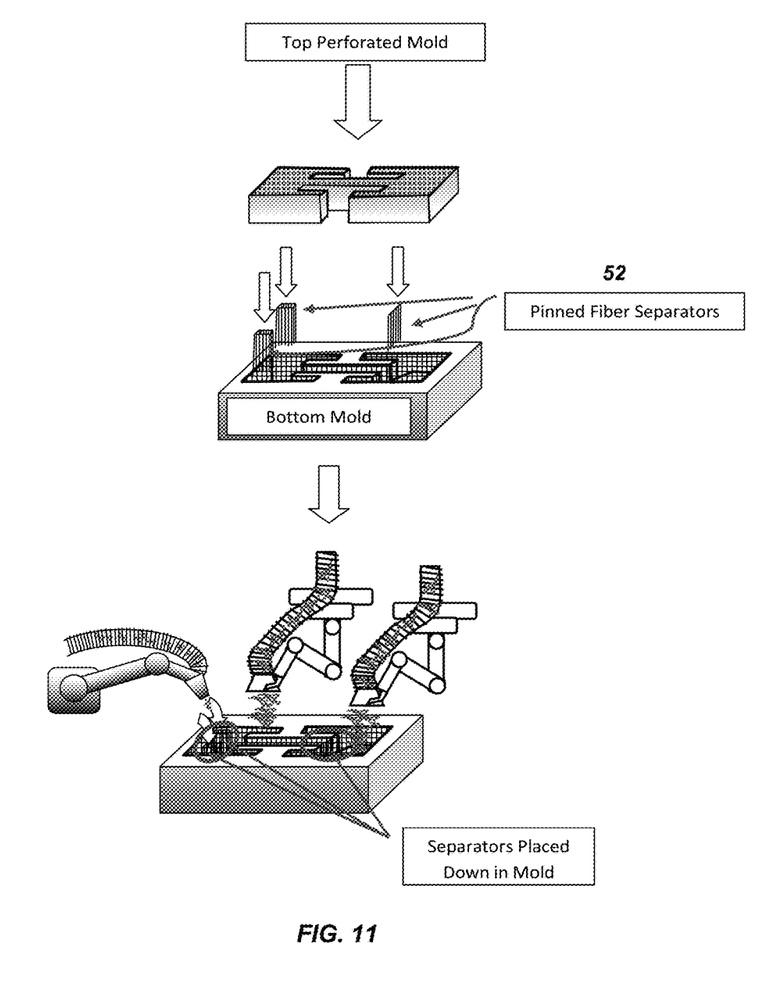
FIG. 11 is an illustration of the use of pinned fiber separators 52 used in the mold while filling with fibers using a multi-axis robot feed.

FIG. 11 illustrates an embodiment herein where one may employ the use of pinned fiber separators. A pinned fiber separator is similar to the pinned zoned chute except it is preferably used only used in specific areas if the zoned chute method is not used. However, it may still be used with the zoned chute method noted herein.

Figure 12:
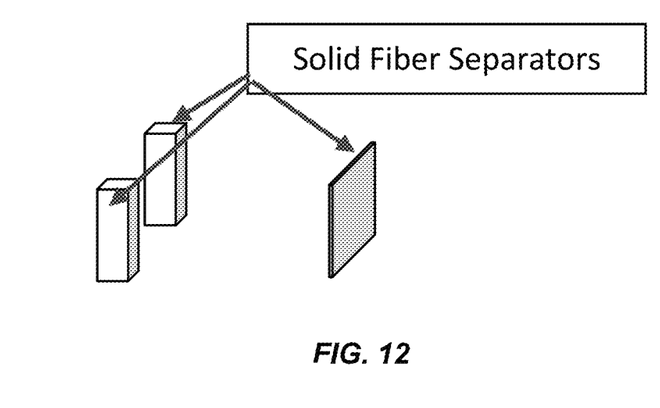
FIG. 12 illustrates solid fiber separators.

FIG. 12 illustrates solid fiber separators. Solid fiber separators are similar to the solid zoned chutes. The solid fiber separators do not allow as much cross-over or fiber interaction between each zone. However, when they are filled with fiber and then lifted out of the mold and then the fiber is compressed after heating, there will be some fiber interaction that leaves the fiber from each zone bonded to the other touching zones. It should be noted that if solid separators are employed, they are preferably lifted slightly from the surface while filling with fiber to promote fiber crossover.

What is claimed is:

1. A method for manufacturing a net shape molded fibrous part that avoids the use of expanded polymeric foam pads comprising:
    (a) providing first and second tool portions of a mold for shaping a fibrous part, the first tool portion having a molding surface and including perforations along all or a portion of the molding surface;
    (b) introducing fiber and binder from one or more robotic fiber injectors to one or a plurality of first selected areas of the molding surface and providing vacuum to said one or a plurality of first selected areas, wherein the one or a plurality of first selected areas are each smaller than an entire area of the molding surface and have a dimension ranging from 7.62 cm×12.7 cm to 45.7 cm×45.7 cm;
    (c) with a fiber delivery apparatus, introducing fiber to the entirety of said molding surface simultaneously, or introducing fiber on top of any fiber that was previously deposited to simultaneously form an entire layer on an entire surface of said fiber that was previously deposited and on any exposed portion of said molding surface;
    (d) determining that a selected fiber loading level is present in said one or plurality of first selected areas;
    (e) closing the first and second tool portions and heating with heated air to form a fiber part that has a first density in said one or a plurality of first selected areas and a second density in one or a plurality of second selected areas, wherein the first density is higher than the second density; and
    (f) forming said net shape molded fibrous part by removing 0 to 10 weight % of the fiber part, the net shape molded fibrous part configured to be installed directly into a vehicle 1 wherein:
    the net shape molded fibrous part is a vehicular panel that comprises a first acoustic layer and a stiff fiber layer on or below the first acoustic layer;
    the first acoustic layer has a stiffness (K) in a range of 0.1 to 5500 newtons/meter (N/m) and an absorption coefficient in a range of 0.4 to 1.0 at frequencies greater than or equal to 500 Hertz (Hz);
    the stiff fiber layer has a stiffness (K) in a range of 5501 to 1,000,000 N/m; and
K=F/d, where F is force in newtons applied over an area of 0.0014062 m$^2$ in the middle of a 0.09 m$^2$ square sample of the first acoustic layer or the stiff fiber layer, respectively, and d is the displacement in meters of the sample in the direction of the applied force.

2. The method of claim 1, wherein said fiber part includes one or a plurality of open sections.

3. The method of claim 2, wherein said one or a plurality of open sections has a dimension from 7.62 cm×12.7 up to and including 45.7 cm×45.7 cm.

4. The method of claim 1, wherein said stiff fiber layer is below the first acoustic layer.

5. The method of claim 1, further comprising positioning a zoned chute between said first tool portion and said one or more robotic injectors, wherein said zoned chute comprises a plurality of zoned regions that define different fill patterns for introduction of said fiber.

6. The method of claim 5, further comprising placing at least one gate over said zoned chute.

7. The method of claim 5, wherein said plurality of zone regions are separated by a plurality of longitudinally extending sections with openings therebetween.

8. The method of claim 1, wherein said one or more robotic fiber injectors inject one or more different fiber blends.

9. The method of claim 8 wherein said different fiber blends comprises a first fiber blend and a second fiber blend wherein the relative amounts of the polymers that make up each of said first and second fiber blend are different.

10. The method of claim 8 wherein said different fiber blends comprise a first fiber blend and a second fiber blend wherein each of said blends includes one or more different polymers.

11. The method of claim 1 wherein in step (e), said fiber that is heated is not compressed before said heating, followed by compressing of said fiber and forming said fiber part.

12. The method of claim 1 wherein said one or more robotic fiber injectors include an airflow separator and feed rollers that feed said fiber and binder to a pin roller that directs fiber into said first tool.

13. The method of claim 12 wherein said one or more robotic fiber injectors has an opening for delivery of said fibers to said first tool wherein said opening is 2.5% to 10.0% smaller than an area in said tool where said fibers and binder are introduced.

14. The method of claim 12 wherein said opening in said one or more fiber injectors has a dimension in the range of 5.0 square inches to 10,000 square inches.

15. The method of claim 1, wherein said first density is greater than or equal 80 Kg/m$^3$ and said second density is less than 80 Kg/m$^3$.

16. The method of claim 1, wherein said first density is in a range of 80 Kg/m$^3$ to 200 Kg/m$^3$ and said second density is in a range of 20 Kg/m$^3$ to less than 80 Kg/m$^3$.

17. The method of claim 1 wherein:
    said stiff fiber layer is on the first acoustic layer;
    said vehicular panel further comprises a second acoustic layer on the stiff fiber layer; and
    the second acoustic layer has an absorption coefficient in a range of 0.5 to 1.0 at frequencies greater than or equal to 500 Hertz (Hz).

18. The method of claim 1, wherein said stiff fiber layer is on the first acoustic layer.

* * * * *